United States Patent [19]

Malcolm

[11] Patent Number: 4,833,626
[45] Date of Patent: May 23, 1989

[54] OPTIMIZING PRINTER THROUGHPUT

[75] Inventor: Jerry W. Malcolm, Austin, Tex.

[73] Assignee: International Business Machines Corporation, Armonk, N.Y.

[21] Appl. No.: 918,413

[22] Filed: Oct. 14, 1986

[51] Int. Cl.$^4$ .............................. G06F 3/12; B41J 3/12
[52] U.S. Cl. .................................. 364/519; 400/124; 400/322; 400/303; 101/93.14
[58] Field of Search ................ 364/518, 519; 400/322, 400/320, 124, 303; 101/93.14; 318/341

[56] References Cited

U.S. PATENT DOCUMENTS

| | | | |
|---|---|---|---|
| 4,147,967 | 4/1979 | Arena | 318/341 |
| 4,332,492 | 6/1982 | Thern et al. | 400/320 |
| 4,353,020 | 10/1982 | Veale | 318/601 |
| 4,405,245 | 9/1983 | Fukushima | 400/144.2 |
| 4,421,431 | 12/1983 | Dorrfub et al. | 400/124 |
| 4,422,781 | 12/1983 | Armfield et al. | 400/18 |
| 4,425,844 | 1/1984 | Carrington et al. | 101/93.14 |
| 4,469,460 | 9/1984 | Hughes et al. | 400/322 |
| 4,517,503 | 5/1985 | Lin et al. | 318/561 |
| 4,649,501 | 3/1987 | Bloom et al. | 364/519 |

Primary Examiner—Gary V. Harkcom
Assistant Examiner—Randy W. Lacasse
Attorney, Agent, or Firm—J. H. Barksdale, Jr.; H. St. Julian

[57] ABSTRACT

A method of improving printer throughput by selecting a print velocity based on the characteristics of a line to be printed. Incorporated into an application program are all available printing velocities to be used for printing. As each line to be printed is buffered, it is analyzed. Based on the analysis, an optimum velocity is selected by the program for causing a printing of the line.

5 Claims, 3 Drawing Sheets

OPTIMIZING PRINTER THROUGHPUT

CROSS REFERENCE TO RELATED APPLICATIONS

U.S. patent application Ser. No. 918,414, entitled IMPROVING PRINTER THROUGHPUT, filed Oct. 14, 1986, and having J. W. Malcolm as inventor.

1. Technical Field

This invention relates generally to printing from a print buffer, and more specifically to printing based on a match of the characteristics of a data stream in the print buffer and available print velocity options, with maximum print velocity being a goal.

2. Background Art

In the prior art are daisywheel printers where variables such as character selection time, required impact force for a selected character, print hammer firing timing, and carrier velocity are taken into account to obtain a desired print quality and to maximize throughput. Impact force, firing timing, and carrier velocity are continually varied during the printing of a line. However, these printers are generally expensive and are primarily tailored for printing high quality text.

With the generally low cost matrix printers contemplated for use with the instant invention, print velocity is selectable by an application programmer (user) from a finite number of velocities capable of being handled by the printers. The user builds a selected velocity into a program for a particular print job. For another job in the program, another velocity will be selected. Illustrative of wire matrix printers contemplated for use with the instant invention are the IBM Proprinter and the IBM Personal Computer Graphics Printer.

The primary problem with the above application driven printers, from a throughput standpoint, is that no variance is permitted while running the application program. Generally, a worst case velocity selection is made on a job basis by the programmer during the writing of the application. With a worst case being selected, there will be many instances, due to the characteristics of the data stream, where the printer is being inefficiently utilized.

With the above in mind, the advance presented by the instant invention is improved printer utilization. This advance is provided by storing a plurality of head movement velocities which are selectable by the application program, and having the application program select a velocity based on the characteristics of a line of graphics data to be printed. The advantage of this advance is that throughput can be increased without materially affecting costs. The same low cost printer can be utilized.

DISCLOSURE OF THE INVENTION

A unique method of optimizing printer throughput is provided by incorporating available head movement velocities into an application program and causing the program to select a velocity based on data stream characteristics for a line of graphics data to be printed. As each line to be printed is buffered, the line is scanned or analyzed against the available printer head movement velocities. Based on the analysis, a maximum workable head movement velocity is selected, and the line of graphics data is printed according to the selected velocity.

BEST MODE FOR CARRYING OUT THE INVENTION

General Description and Definitions

Matrix type printers generally include a printhead attached to a carrier. Illustrative of low cost matrix type printers are the IBM Proprinter and the IBM Personal Computer Graphics Printer. Included in the printhead is a vertical column of a plurality print wires. Selected ones of the print wires are activated or fired as the printhead traverses a print line on a page to be printed. The firing of each print wire will result in a dot on the paper being printed. Selective firing of the wires will ultimately result in the construction or printing of a character and/or a graphics object. For example, the character "A" may be made up of various dots in a matrix 5 columns wide and 8 rows high.

With the above noted IBM printers, there are four graphics printing formats available to an application programmer for three separate densities of printed dots and two separate head movement velocities. These formats will be described in detail later herein. The criteria for selection of these formats relates to the density of the dots in the graphics data. The density of the dots in the graphics data directly affects the frequency of firing the print wires. If consecutive dots have sufficient separation, then the carrier may move at a faster rate. Also, with less density, a reduced amount of data may be sent to the printer using certain formats.

For any particular job, one of the available velocities is selected by the user and embedded in the program. As such, outside of modifying the program, no alternative velocities are available to an operator using the application program on a stand alone, or host connected, device controlled display computer workstation or system. In many instances, the system will be a keyboard/display computer system, and as such, the device is a keyboard. Included in the system will be a printer such as a matrix printer described above.

Figures 1, 2, 3:
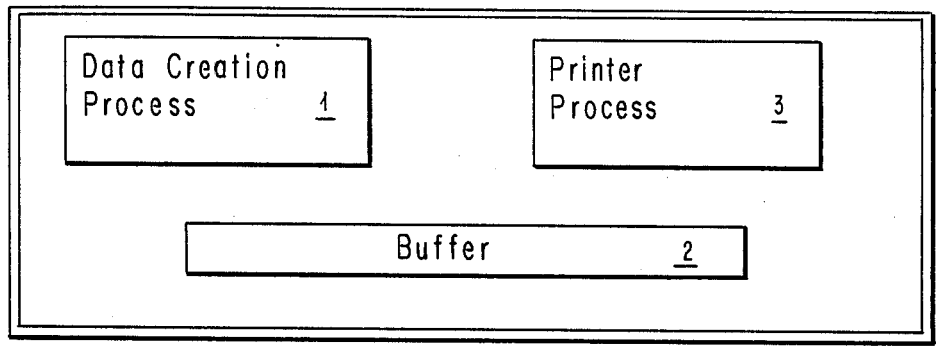
FIG. 1 is a block diagram illustration of the major elements of an application program that causes data to be printed in a graphics format.
FIG. 2 is a pictorial representation of a portion of a line which can be printed at a fast head movement velocity.
FIG. 3 is a pictorial representation of a portion of a line which must be printed at a slow print head movement velocity.

In FIG. 1 the major elements of application program that causes printing of graphics data is shown. The application program is made up of a minimum of two processes. A process is defined as a section of code that performs a particular function. Data creation process 1 determines what data is to be printed, and places that data in a buffer 2. When the buffer 2 contains all the data deemed necessary by data creation process 1, printing process 3 takes control and sends the data in buffer 2 to the printer.

Refer next to FIG. 2. Graphics data containing dots no closer than 1/60 inch can be printed in one format requiring 60 data bytes for every inch of printed output. In this instance, a fast head movement velocity is to be used by the printer. For the above noted printers, the identifier that is sent to the printer to specify this format is an Escape character (Esc) followed by the letter K.

Refer next to FIG. 3. Graphics data that contains dots no closer than 1/120 inch can be printed in a second format requiring 120 data bytes for every inch of printed output. In this instance, a slow head movement velocity is to be used by the printer. For the above noted printers, the identifier that is sent to the printer to specify this format is an Escape character followed by the letter L.

Figure 4:
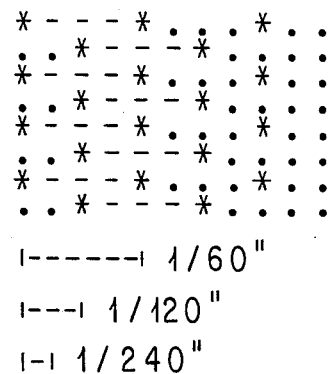
FIG. 4 is a pictorial representation of a portion of a line having no two consecutive dots in a row and which can be printed at a fast head movement velocity.

Refer next to FIG. 4. Graphics data that contains columns of dots no closer than 1/120 inch and has no two consecutive dots in a row closer than 1/60 inch can be printed using a third format requiring 120 data bytes for every inch of printed output. However, in this case, since no consecutive dots are closer than 1/60 inch, a fast head movement velocity can be used by the printer. For the above noted printers, the identifier that is sent to the printer to specify this format is an Escape character followed by the letter Y.

Figure 5:
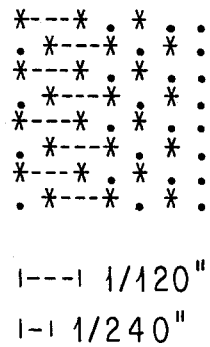
FIG. 5 is a pictorial representation of a portion of a line having no two consecutive dots in a row and requiring a slow head movement velocity.

Refer next to FIG. 5. Graphics data that contains columns of dots spaced at 1/240 inch must use a fourth format requiring 240 data bytes for every inch of printed output. In this format, a requirement exists that no two consecutive dots in a row be closer than 1/120 inch. The printer will use a slow head movement velocity. If consecutive dots are closer than 1/120 inch, then some dots will not be printed. For the above noted printers, the identifier that is sent to the printer to specify this format is an Escape character followed by the letter Z.

With the instant invention, a program having the elements illustrated in FIG. 1. is provided. Added to the printer process 3 is code for analyzing the characteristics of the data stream for the line of graphics data to be printed. Included in the code are line buffering capabilities, and all available formats for printing graphics data. Following a determination of the characteristics of the data in buffer 2, the printer process 3 selects the optimum format from the available formats for printing graphics data, and then the line is issued to the printer with the selected format for printing at the selected velocity.

Detailed Description

All graphics data will be placed in buffer 2 by the data creation process 1 in the format for printing the line illustrated in FIG. 5. This is a default format which is equivalent to a worst case selection by a user. All other formats are derivatives of this format. Upon analyzing the data, it may well be that a different format can be selected for printing the data at a higher velocity. The printer process 3 analyzes the data in the buffer 2 and selects an optimum format for printing the graphics data using the criteria set out in the following print mode determination table.

| Criteria | Format | Send |
| --- | --- | --- |
| All bytes = 0 except 0,4,8,12,etc | Esc K | Bytes 0,4,8,12,etc |
| (1) All odd bytes = 0 (2) No dots side-by-side in consecutive even bytes | Esc Y | Even bytes |
| All odd bytes = 0 | Esc L | Even bytes |
| Odd bytes not = 0 | Esc Z | All bytes |

Set out below is an illustration of a routine to be included in printer process 3. This routine is in programming design language from which both source code and machine code are derivable.

```
SCAN ALL GRAPHICS DATA BYTES IN BUFFER
IF ALL BUT BYTES THAT ARE MULTIPLES OF 4 (BEGINNING
      AT BYTE #0) ARE EQUAL TO ZERO THEN
   DIVIDE GRAPHICS COUNT BY FOUR
   SEND ESCAPE CHARACTER, 'K', COUNT(LOW), COUNT(HIGH)
   BEGIN AT BYTE ZERO AND SEND EVERY FOURTH BYTE UNTIL
      COUNT IS EXHAUSTED
ELSE (OTHER THAN MULTIPLE-OF-4 BYTES NOT ZERO)
   IF ALL ODD BYTES (BEGINNING AT BYTE #0) ARE EQUAL
      TO ZERO THEN
      DIVIDE GRAPHICS COUNT BY TWO
      IF THERE ARE NO DOTS IN THE SAME POSITION IN
         CONSECUTIVE EVEN BYTES
         SEND ESCAPE CHARACTER,'Y',COUNT(LOW),COUNT(HIGH)
         ELSE (CONSECUTIVE DOTS IN EVEN BYTES)
         SEND ESCAPE CHARACTER,'L',COUNT(LOW),COUNT(HIGH)
      ENDIF
      BEGIN AT BYTE ZERO AND SEND EVERY OTHER BYTE
         UNTIL COUNT EXHAUSTED
   ELSE (ODD BYTES ARE NON-ZERO)
      SEND ESCAPE CHARACTER, 'Z', COUNT(LOW), COUNT(HIGH)
      SEND EVERY BYTE UNTIL COUNT IS EXHAUSTED
   ENDIF
ENDIF
```

Figure 6:
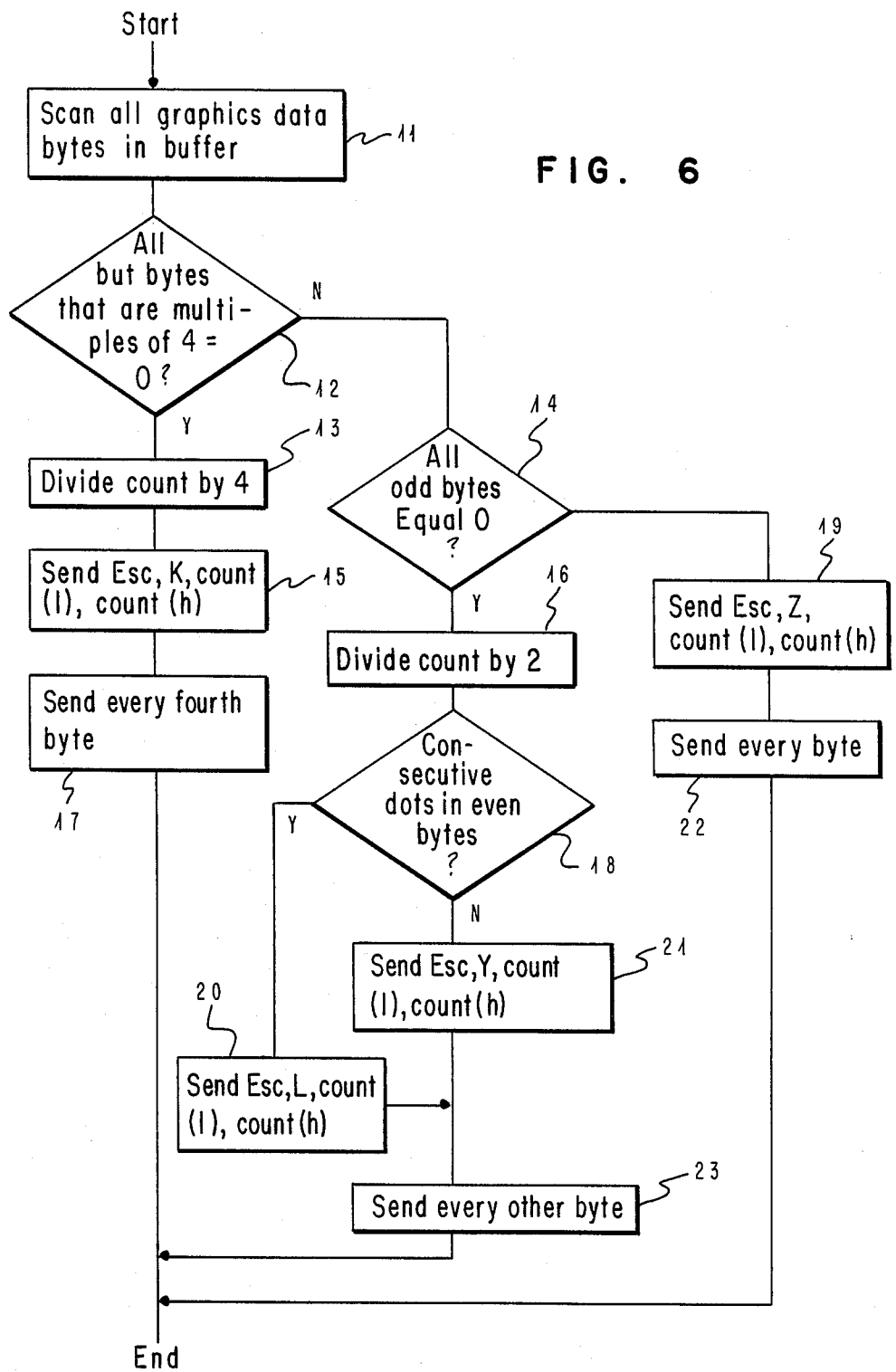
FIG. 6 is a flow chart illustrating a determination of head velocity based on criteria which includes the characteristics of the buffered line of graphics data.

Refer next to FIG. 6 in conjunction with the above programming design language. The programming design language defines the operations performed by the printer process 3 in determining an optimum printing format and causing subsequent printing to occur according to the format.

All data in buffer 2 must be scanned before the results can be analyzed. This is illustrated in block 11.

The format that causes printing at the highest velocity and has the fewest number of bytes to send to the printer is Esc K (FIG. 2). If buffer 2 contains one byte every 1/240 inch, since the Esc K format requires that data density be not less than 1/60 inch, all the data bytes with the exception of every fourth byte must be zero or contain no graphics data dots. This is illustrated in block 12. If bytes that are not multiples of four are all zero, then the graphics data count is divided by 4 as shown in block 13. This is since only every fourth byte will be sent. Next, the 4-byte graphics Escape K sequence header is sent to the printer as indicated by block 15. The header is followed by every fourth byte from the graphics buffer beginning at byte 0 until the count is exhausted as shown in block 17.

If the data in the buffer 2 does not qualify for the Esc K format, then the next best format is the Esc Y format (FIG. 3). The printhead will move at the same velocity as with the Esc K format. However, twice as many data bytes must be sent. In order to qualify for Esc Y, all the odd-numbered bytes must be zero as determined by block 14. If zero, the columns of data will have a minimum separation of 1/120 inch. Once this criteria has been met, the graphics data count is divided by 2 as indicated by block 16, and a determination is made as to whether a second criteria is met. Moving at the fast print speed, the printer is only able to print every other dot position. Consecutive dots must have a minimum separation of 1/60 inch when the fast printhead velocity is to be used. Therefore, if the print buffer contains no dots in the same position in consecutive even bytes as determined by block 18, then the Esc Y format will be selected. The 4-byte graphics Escape Y sequence header is sent to the printer as illustrated in block 21. The header is followed by all the even-numbered bytes from the graphics buffer 2 beginning at byte 0 until the count is exhausted as indicated by block 23.

If all the odd-numbered bytes in the buffer are zero, and there are dots in the same position in consecutive even bytes as indicated by block 18, the the third format (Esc L) may be used (FIG. 4). The 4-byte graphics Escape L sequence header is sent to the printer as indicated by block 20, followed by all the even-numbered bytes from the graphics buffer beginning at byte 0 until the count is exhausted as in block 23.

Finally, if none of above criteria are met, the buffer must be sent using the Esc Z format (FIG. 5). Here, the graphics data count as was passed to the print process 2 by the data creation process 1 is used. The 4-byte graphics Escape Z sequence header is sent to the printer as indicated by block 19. The header is followed by all the bytes in the buffer as indicated by block 22.

In summary, a unique method of optimizing printer throughput is provided by incorporating available printhead movement velocities into an application program and causing the program to select a velocity based on data stream characteristics for a line of data to be printed. As each line is buffered, the line is analyzed against the available printhead movement velocities. Based on the analysis, a maximum workable head movement velocity is selected, and the line of data is printed according to the selected velocity.

While the invention has been particularly shown and described with reference to a preferred embodiment, it will be understood by those skilled in the art that various changes in form and detail may be made without departing from the spirit and scope of the invention.

I claim:

1. In a printing system including a printer capable of printing at one of a plurality of fixed head movement velocities, a method of optimizing printer throughput, said method comprising the steps of:
   (a) determining a density of dots associated with a line of data to be printed
   (b) comparing said density with characteristics of said plurality of head movement velocities to determine a maximum velocity for printing said line of data;
   (c) selecting one of said plurality of head movement velocities which is equal to said maximum velocity or a predetermined one of said plurality of head movement velocities if said maximum velocity is not equal to one of said plurality of head movement velocities; and
   (d) transmitting said line of data to said printer to be printed at said selected one of said plurality of head movement velocities.

2. A method according to claim 1 further including the step of transmitting a header identifying said selected one of said plurality of head movement velocities to said printer prior to said step of transmitting said line of data.

3. In an application program driven printing which has a plurality of fixed printhead printing velocities available to a programmer to incorporate into said program for printing particular jobs, a method of improving printer throughput, said method comprising the steps of:
   (a) incorporating said velocities into said program;
   (b) analyzing a line of data to be printed with said program to determine a density of dots associated therewith;
   (c) comparing said density with characteristics of said velocities incorporated in said program to determine a maximum velocity; and
   (d) causing said program to select one of said incorporated velocities which is equal to said determined maximum velocity or a predetermined one of said incorporated velocities if said determined one of said incorporated velocities if said determined maximum velocity is not equal to one of said velocities.

4. A method according to claim 3 including the step of sending said line of data to a printer for printing at said selected one of said incorporated velocities.

5. A method according to claim 4 including the step of adding an identifier to said line of data before sending said line of data to said printer for causing said printer to print said line of data at said selected one of said incorporated velocities.

* * * * *

UNITED STATES PATENT AND TRADEMARK OFFICE
CERTIFICATE OF CORRECTION

PATENT NO. : 4,833,626

DATED : May 23, 1989

INVENTOR(S) : Jerry W. Malcolm

It is certified that error appears in the above-identified patent and that said Letters Patent is hereby corrected as shown below:

Col. 6, line 12, after "printed", insert --;--;

line 47, delete "one of said incorporated velocities if said deter-";

line 48, delete "mined".

Signed and Sealed this

Eighth Day of October, 1991

Attest:

HARRY F. MANBECK, JR.

*Attesting Officer*          *Commissioner of Patents and Trademarks*